June 10, 1958 C. L. WANLASS 2,838,675
REVERSIBLE CURRENT CIRCUIT
Filed May 2, 1955
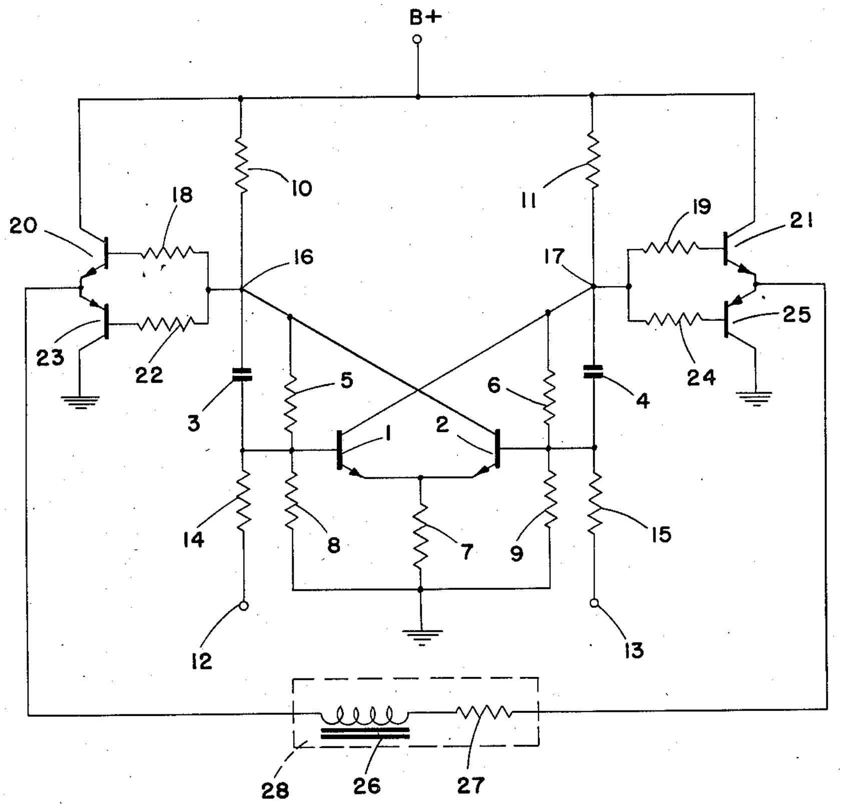
INVENTOR.
CRAVENS L. WANLASS
BY William R. Lane
ATTORNEY United States Patent Office 2,838,675 Patented June 10, 1958

2,838,675

REVERSIBLE CURRENT CIRCUIT

Cravens L. Wanlass, Whittier, Calif., assignor to North American Aviation, Inc.

Application May 2, 1955, Serial No. 505,128

8 Claims. (Cl. 250—36)

This invention relates to an electronic circuit which provides a current flow in one direction or another according to control signals. In a particular embodiment of the invention, a multivibrator responds to pulses to control the direction of current flow.

A multivibrator is ordinarily composed of a pair of coupled amplifying devices such as transistors or tubes. At alternate intervals the output of one, which is conducting, is used to bias the other to cutoff and vice-versa. The multivibrator may or may not require a trigger pulse to provide abrupt change from conduction by one tube, or transistor, to conduction by the other. The use of transistors and such circuits offer several advantages over electron tubes, mainly compactness, lower heat dissipation and lower power requirements.

In obtaining a transistor device having a fast response, consideration must be given to the amount of current the transistor can carry and the various time constants of the circuit. The device of the invention is particularly advantageous in that it provides a circuit capable of reversing the direction of current to a load at high frequencies and requires no center tap return path on the load. This reduces by a factor of two, the number of turns that must be present in a given inductive load, such as a magnetic recording head which is used to impress magnetic poles of one polarity or another, upon a magnetic tape.

As a further feature, the device of the invention provides a reversal of current to a load upon the receipt of a pulse. A square wave signal may thus degenerate, in the various circuits which transmit it, to a pulse and the multivibrator, by providing a reversing current upon receipt of the pulse, is in effect, reconstituting, or reshaping, the square wave.

It is therefore an object of this invention to provide a multivibrator which provides a reversible output current to a load.

It is another object of this invention to provide a circuit which provides an output current in a direction according to a control signal.

It is the further object of this invention to provide a reconstituted current flow pulse from a trigger pulse by the use of the multivibrator.

Another object of this invention is to provide a reversible current through an inductive load without requiring a center tap on the load.

It is a still further object of this invention to provide a circuit which provides a reversal of current through a load upon receipt of a trigger pulse.

It is a still a further object of this invention to provide a circuit which directs current through a load in accordance with the state of a multivibrator.

Other objects of this invention will become apparent from the following description taken in connection with the accompanying drawing which is a schematic diagram of the device.

Referring to the drawing, transistors 1 and 2 each have their collectors cross-coupled to the base of the alternate transistor through respective capacitors 3 and 4, and resistors 5 and 6. The transistors are shown as emitter coupled by a common emitter resistor 7 connected from each emitter to ground. The base of transistor 1 is connected to ground through resistor 8 and the base of transistor 2 is connected to ground through resistor 9. Resistors 10 and 11 connect respective collectors of transistors 1 and 2 to the B+ supply.

Positive trigger pulses are received at terminals 12 and 13, alternatively, and through resistors 14 and 15, they are transmitted to the bases of transistors 1 and 2.

Points 16 and 17 are the output terminals whose potentials indicate the state of the multivibrator. Assuming that this multivibrator is bistable, that it has two stable states, a low voltage at point 16 indicates that transistor 2 is conducting. Point 16 is connected through resistors 18 and 22 to transistors 20 and 23. Point 17 is connected through resistors 19 and 24 to the bases of transistors 21 and 25. If point 16 is low, transistor 2 conducting, the charge on capacitor 3 is reduced as is the base voltage of transistors 20 and 23 Because transistors 20 and 23 are of oppositely-conductive types, a low voltage on the base of transistor 20 with respect to the emitter prevents conduction, but a low voltage on the base of transistor 23 with respect to the emitter allows it to fully conduct and conventional current flows through transistor 21 in the direction indicated by the emitter arrow through load 26, and thence through transistor 23 to ground. If point 17 had been low, the voltage capacitor 4 would have dropped as would the base potential of transistor 25 Transistor 25 would then commence to fully conduct and conventional current would flow from the B+ supply through transistor 20 to load 26 in the direction indicated by the emitter arrow of transistor 25. Transistor 20 would be allowed to conduct by reason of the fact that its base would be at a high potential received from point 16. It is noted that transistors 23 and 25 are of the oppositely-conductive types from transistors 20 and 21. Load 26 may, for example, be the inductive coil of a magnetic recording head. Resistor 27 is a load resistor or current-limiting resistor which, together with inductance 26, comprises the load impedance 28 of the device. There is no necessity for a center tap and the number of turns required on the head is reduced by a factor of two. By reason of the reversing current, reversible magnetic poles can be recorded by the signal head.

Operation of the device of the invention is accounted for by the fact that as transistor 20 is made to conduct by a high potential received from point 16 at its base, transistor 23 is prevented from conducting by that same signal received from point 16. Therefore transistor 23 will not operate to short transistor 20 to ground. The same holds true for transistor 25 which is held to nonconduction by the same signal that causes transistor 21 to conduct.

This invention provides an improved circuit similar to push-pull operation conventionally used. However, the need for a center-tap return is eliminated by the use of oppositely-conductive transistors.

The multivibrator has thus far been treated as bistable, or as a flip-flop. However, it is readily adaptable to acquire either free-running or monostable characteristics. The monostable multivibrator is described as one that has two states, and upon a triggering pulse changes from its stable, first, state to its second state. Spontaneously, thereafter it reverts to its original state without triggering. In order to modify the circuit to make the multivibrator monostable, it is only necessary that the relative values of certain components be changed. Resistor 9, for example, can be decreased, approximately halved, in order to do this. This changes the potential of the base electrode and the current then flowing through the transistor 2 is not sufficient to maintain the drop across resistor 7 at a potential high enough to keep transistor 1 from commencing to conduct. The circuit is, consequently, monostable.

A free-running multivibrator is one which is oscillatory. That is, first one transistor conducts and then the other without any required triggering. In order to acquire this characteristic, the circuit of the drawing is modified in that resistor 7 is decreased in value. As a result, one transistor conducts and its RC circuit becomes charged and that transistor ceases conducting, and the other transistor commences conducting and cuts off the first transistor. An increase in values of both resistors 8 and 9 would also cause this device to be oscillatory or free-running.

If the device is free-running, it, of course, requires no trigger pulse to reverse the direction of current to the load. If it is monostable, a single trigger pulse reverses the direction of current through the load until the multivibrator spontaneously reverts to its original state, whereupon the current flow reverts to its original direction.

Although the invention has been described and illustrated in detail it is to be clearly understood that the same is by way of illustration and example only and is not to be taken by way of limitation, the spirit and scope of this invention being limited only by the terms of the appended claims.

I claim:

1. In an electronic circuit, a direct current source, a first and second pair of transistors, the transistors of a pair being of oppositely-conductive types, each said pair of transistors connected in series across said direct current source, a load impedance connected from a point intermediate one pair of transistors to a point intermediate the other pair of transistors, and means for simultaneously controlling the conduction of said transistors.

2. The combination recited in claim 1 wherein said means for simultaneously controlling the conduction of said transistors comprises a multivibrator having each output circuit connected to the control elements of a respective pair of transistors.

3. In an electronic circuit, a direct current source, a first and second pair of transistors, each transistor of a pair being of oppositely-conductive types, the collector-to-emitter circuit of each said pair of transistors connected in series across said direct current source, a load impedance connected from a point intermediate one pair of transistors to a point intermediate the other pair, means providing a control voltage connected to the bases of said transistors, said transistors operated so that while a transistor of each pair conducts, the other transistor of the pair is nonconducting.

4. In an electronic circuit, a multivibrator, a first and second pair of transistors of oppositely-conductive types, a direct current source, the collector-to-emitter circuit of each said pair of transistors connected in series across said direct current source, a load impedance connected from a point intermediate one pair of transistors to a point intermediate the other pair of transistors, the bases of said transistors connected to be controlled by the output of said multivibrator.

5. In an electronic circuit, a direct current source, a load impedance, a first current path comprising a first transistor connected in series with said direct current source and one side of said load and a second transistor connected from the other side of said load to the return path of said direct current source, a second current path comprising a third transistor connected in series circuit with said direct current source and said other side of said load, and a fourth transistor connected from said one side of said load to the return path of said direct current source, and means for placing a potential on the control elements of said transistors alternatively allowing the conduction of said first and second transistors or said third and fourth transistors.

6. In an electronic circuit, a multivibrator, a first and second circuit connected respectively to the output terminals of said multivibrator, each said circuit comprising a pair of transistors of oppositely-conductive types connected in series, said transistors having similar terminals connected to receive the output of said multivibrator, a direct current source connected in series across each said pair of transistors, a load impedance connected from the common connection of one pair of transistors to the common connection of the other pair of transistors.

7. In an electronic circuit, a multivibrator, a first and second circuit connected respectively to the output terminals of said multivibrator, each said circuit comprising a pair of transistors of oppositely-conductive types having similar terminals connected to be controlled by the output of said multivibrator, one transistor of each said pair being connected to a direct-current source and adapted to drive said load and the other transistor of each said pair being connected to said load to provide a return path from said load to said direct-current source.

8. In combination, a load, first circuit means for providing a unidirectional current path through said load, second circuit means for providing a unidirectional current path having a direction opposite to said first current path through said load, and means for causing said first and second circuit means to alternatively provide current paths through said load.

References Cited in the file of this patent

UNITED STATES PATENTS

| | | |
|---|---|---|
| 2,666,818 | Shockley | Jan. 19, 1954 |
| 2,714,202 | Downing | July 26, 1955 |

OTHER REFERENCES

Article: "A Transistor Reversable Counter," by Trent, pp. 484–500 of "The Transistor," a Bell Lab. publication dated Dec. 4, 1951.

Article: "Complementary Symmetry Transistor Circuits," by Lohman, pp. 140–143 of Electronics for September 1953.